US012675120B2

(12) United States Patent
Oda et al.

(10) Patent No.:     US 12,675,120 B2
(45) Date of Patent:        Jul. 7, 2026

(54) CONTROL DEVICE AND CONTROL METHOD FOR MOVING BODY

(71) Applicant: FUJI CORPORATION, Chiryu (JP)

(72) Inventors: Takuya Oda, Toyoake (JP); Koji Kawaguchi, Kasugai (JP); Hisato Sawanami, Kariya (JP)

(73) Assignee: FUJI CORPORATION, Chiryu (JP)

( * ) Notice:     Subject to any disclaimer, the term of this patent is extended or adjusted under 35 U.S.C. 154(b) by 48 days.

(21) Appl. No.:     18/693,291

(22) PCT Filed:     Sep. 28, 2021

(86) PCT No.:     PCT/JP2021/035578
§ 371 (c)(1),
(2) Date:     Mar. 19, 2024

(87) PCT Pub. No.:     WO2023/053180
PCT Pub. Date: Apr. 6, 2023

(65)          Prior Publication Data
US 2024/0385630 A1       Nov. 21, 2024

(51) Int. Cl.
G05D 1/698          (2024.01)
G05D 105/28          (2024.01)
G05D 107/70          (2024.01)

(52) U.S. Cl.
CPC ....... G05D 1/6987 (2024.01); G05D 2105/28 (2024.01); G05D 2107/70 (2024.01)

(58) Field of Classification Search
CPC ............. G05D 1/6987; G05D 2107/70; G05D 2105/28

(Continued)

(56)          References Cited

U.S. PATENT DOCUMENTS 11,180,069 B2 *   11/2021   Jarvis ..................... G06Q 10/08
2011/0010023 A1 *   1/2011   Kunzig ..................... G01S 5/16
                                                                      701/2

(Continued)

FOREIGN PATENT DOCUMENTS

JP          2001-301987 A      10/2001
JP          2019-169019 A      10/2019
WO      WO 2017/090108 A1      6/2017

OTHER PUBLICATIONS

International Search Report issued Dec. 21, 2021 in PCT/JP2021/035578, filed on Sep. 28, 2021, 2 pages.

*Primary Examiner* — Yazan A Soofi
(74) *Attorney, Agent, or Firm* — Oblon, McClelland, Maier & Neustadt, L.L.P.

(57)          ABSTRACT

A control device for a moving body according to the present disclosure is a control device for a moving body capable of recognizing and supporting a cargo handling device on which a package is placed and moving while estimating a self-location, and the control device is configured to, when causing the moving body to align and arrange multiple cargo handling devices at an arrangement location, acquire a position of a previous cargo handling device placed in advance at the arrangement location and control the moving body to place a next cargo handling device at a position determined based on the acquired position of the previous cargo handling device. Accordingly, it is possible to align and arrange multiple cargo handling devices at an arrange-ment location so that a gap is as small as possible by using a moving body capable of moving while estimating a self-location.

9 Claims, 5 Drawing Sheets

(58) Field of Classification Search
USPC .......................................................... 701/2
See application file for complete search history.

(56) References Cited

U.S. PATENT DOCUMENTS

| | | | |
|---|---|---|---|
| 2012/0191272 A1* | 7/2012 | Andersen ............. | G06Q 10/087 |
| | | | 705/28 |
| 2016/0137419 A1* | 5/2016 | Sullivan ................. | G05B 15/02 |
| | | | 700/217 |
| 2016/0236869 A1* | 8/2016 | Kimura ............... | B65G 1/1378 |
| 2020/0026304 A1* | 1/2020 | Thode ................... | B66F 9/0755 |
| 2020/0327633 A1* | 10/2020 | Goto ...................... | G06Q 10/08 |
| 2023/0281746 A1* | 9/2023 | Sakai ................... | G06Q 10/047 |
| | | | 705/7.25 |
| 2024/0118702 A1* | 4/2024 | Cella ................. | G06Q 10/0833 |
| 2024/0144141 A1* | 5/2024 | Cella ................. | G06Q 30/0202 |
| 2024/0385630 A1* | 11/2024 | Oda ....................... | G06Q 10/08 |

* cited by examiner

Fig. 1

CONTROL DEVICE AND CONTROL METHOD FOR MOVING BODY

TECHNICAL FIELD

The present disclosure relates to a control device and a control method for a moving body that can recognize and support a cargo handling device on which a package is placed and can move while estimating a self-location.

BACKGROUND ART

Conventionally, there has been known a loading system in which articles are loaded on a truck by multiple work wheeled platforms each having a motor to which power is supplied via a trolley line and traveling on a rail disposed along a loading platform of the truck (for example, refer to Patent Literature 1). In this loading system, at least a first loading position of a leading work wheeled platform is notified to the subsequent work wheeled platform, and each work wheeled platform is notified of the number of the work wheeled platforms from the leading. Further, each work wheeled platform stores the first loading position of the work wheeled platform, and derives the loading position based on the first loading position in the second and subsequent times. Accordingly, even when the leading work wheeled platform is removed to the outside of the route due to some circumstances or the number of work wheeled platforms varies in the middle, the remaining work wheeled platforms can recognize a reference position and continue loading.

PATENT LITERATURE

Patent Literature 1: JP-A-2001-301987

BRIEF SUMMARY

Technical Problem

The conventional loading system is dedicated equipment for loading a load on a truck, and requires installation of a rail, a trolley line for power supply, and the like. Meanwhile, for example, a moving body capable of autonomous traveling, such as an autonomous mobile robot (AMR), is used to convey a pallet or a cargo handling device, such as a wheeled platform, thereby eliminating the need for the installation of rails or trolley lines. It is noted that, it is difficult to eliminate an estimation error of the self-location of a moving body that autonomously travels, and it is not easy to stop the moving body at a targeted position with high accuracy. For this reason, when the cargo handling devices are aligned and arranged in a predetermined arrangement location by the moving body capable of autonomous traveling, a target position of the conveyance wheeled platform has to be set so that the interval between the adjacent cargo handling devices is secured to some extent in order to suppress the interference between the cargo handling devices, and the cargo handling devices cannot be arranged at the arrangement location without a gap.

In view of the above, a main object of the present disclosure is to align and arrange multiple cargo handling devices at an arrangement location so that a gap is as small as possible by using a moving body capable of moving while estimating a self-location.

Solution to Problem

According to an aspect of the present disclosure, there is provided a control device for a moving body capable of recognizing and supporting a cargo handling device on which a package is placed and moving while estimating a self-location, in which the control device is configured to, when causing the moving body to align and arrange multiple cargo handling devices at an arrangement location, acquire a position of a previous cargo handling device placed in advance at the arrangement location and control the moving body to place a next cargo handling device at a position determined based on the acquired position of the previous cargo handling device.

The control device for a moving body according to the present disclosure can acquire the position of the previous cargo handling device placed in advance at the arrangement location when causing the moving body capable of moving while estimating the self-location to align and arrange the multiple cargo handling devices at the arrangement location. Further, the control device can control the moving body to place the next cargo handling device at the position determined based on the acquired position of the previous cargo handling device. As a result, even when an error occurs in the estimation of the self-location of the moving body, it is possible to place the next cargo handling device at the arrangement location while reducing the gap with the previous cargo handling device as much as possible. As a result, with the control device of the present disclosure, it is possible to align and arrange the multiple cargo handling devices at the arrangement location so that the gap is as small as possible.

According to another aspect of the present disclosure, there is provided a control method of a moving body capable of recognizing and supporting a cargo handling device on which a package is to be placed and moving while estimating its self-location, the method including: when causing the moving body to align and arrange multiple cargo handling devices at the arrangement location, acquiring a position of a previous cargo handling device placed in advance at an arrangement location and controlling the moving body to place a next cargo handling device at a position determined based on the acquired position of the previous cargo handling device.

According to this method, even when an error occurs in the estimation of the self-location of the moving body, it is possible to place the next cargo handling device at the arrangement location while reducing the gap with the previous cargo handling device as much as possible. As a result, it is possible to align and arrange the multiple cargo handling devices at the arrangement location so that the gap is as small as possible.

BRIEF DESCRIPTION OF DRAWINGS

FIG. 1 is a schematic configuration diagram illustrating a physical distribution center to which a moving body including a control device of the present disclosure is applied.

DESCRIPTION OF EMBODIMENTS

Next, an embodiment for carrying out the present disclosure will be described with reference to the drawings.

Figure 1:
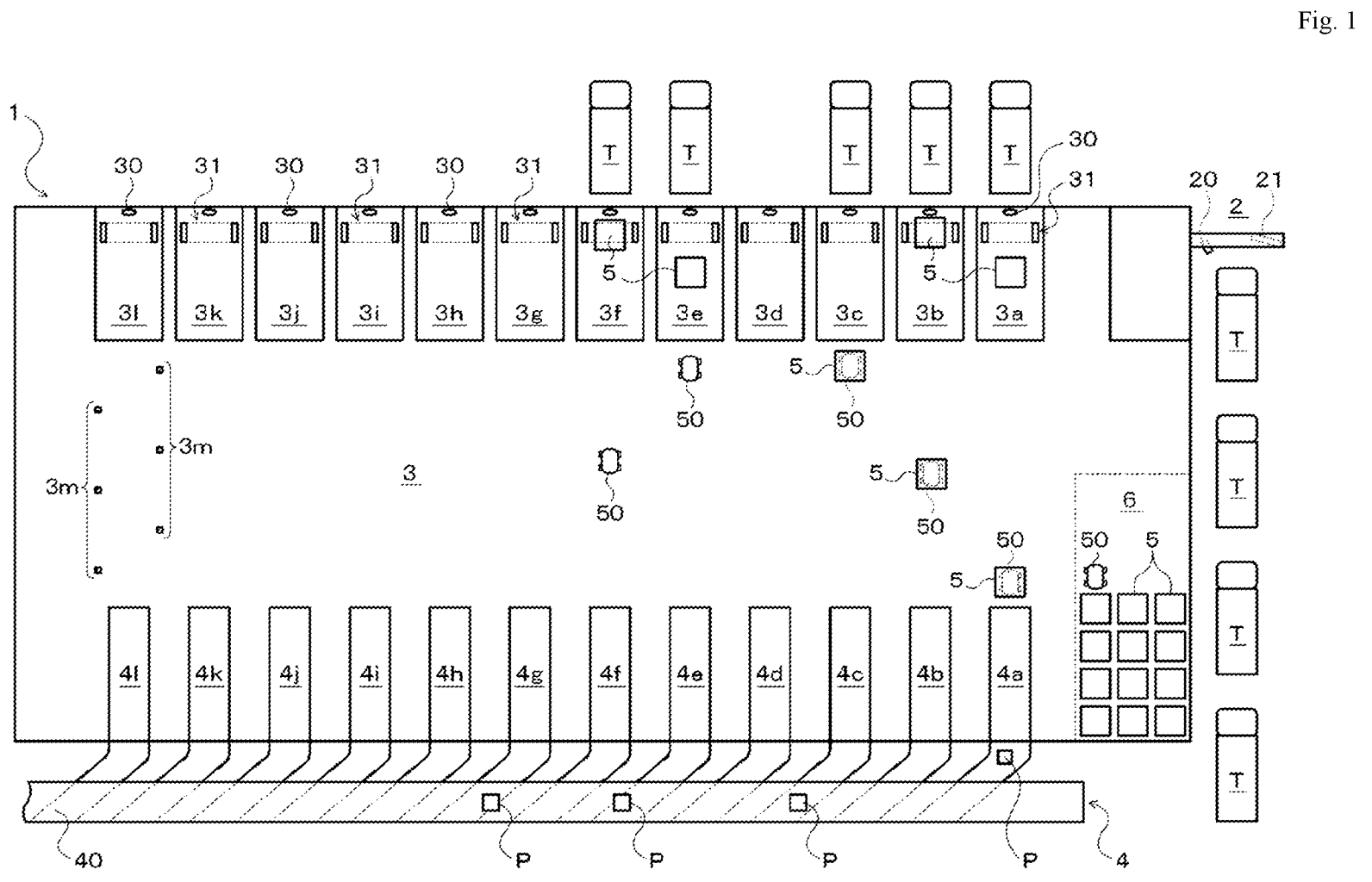
Figure 2:
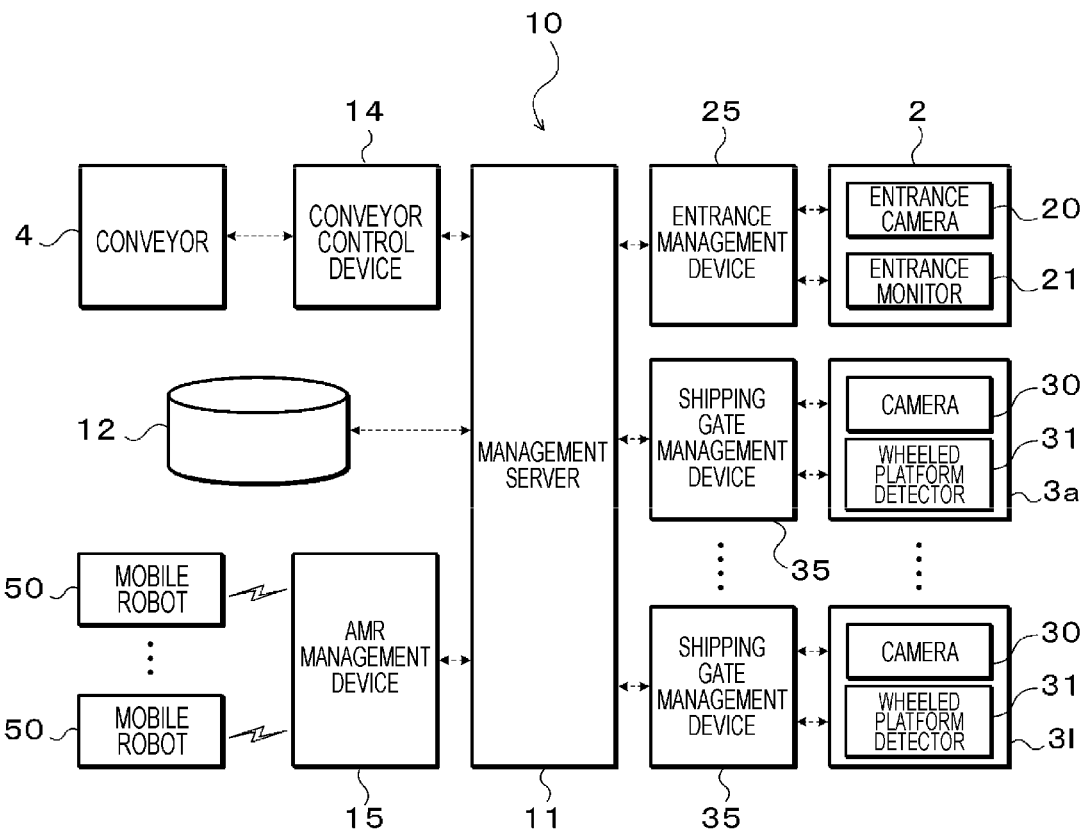
FIG. 2 is a block diagram illustrating a physical distribution management system of the physical distribution center of FIG. 1.

FIG. 1 is a schematic configuration diagram illustrating physical distribution center 1 to which autonomous mobile robot (AMR) 50 as an autonomous moving body including a control device of the present disclosure is applied, and FIG. 2 is a block diagram illustrating physical distribution management system 10 of physical distribution center 1. Physical distribution center 1 illustrated in FIG. 1 is a facility in which storage, conveyance, cargo handling, packaging, distribution processing, and the like of a package (product) are performed. As illustrated, physical distribution center 1 includes, in addition to multiple mobile robots 50, entrance 2 of delivery vehicle T such as a truck, shipping area 3 having multiple shipping gates 3a, 3b, 3c, 3d, 3e, 3f, 3g, 3h, 3i, 3j, 3k, and 3l (hereinafter, the shipping gates are collectively referred to as "shipping gate 3x" as appropriate), conveyor 4 that conveys a large number of packaged packages P from a warehouse (not illustrated) to shipping area 3, and multiple wheeled platforms 5. In physical distribution center 1, package P is conveyed to shipping area 3 by conveyor 4 and transferred to wheeled platform 5. Wheeled platform 5 as a cargo handling device on which package P is placed is conveyed to corresponding shipping gate 3x by mobile robot 50. Wheeled platform 5 on which package P is placed is loaded on corresponding delivery vehicle T at shipping gate 3x, and is conveyed to a shipping destination by delivery vehicle T.

In entrance 2 of physical distribution center 1, entrance camera 20 for imaging delivery vehicle T arriving at entrance 2, monitor 21 for visually providing various kinds of information to a driver of delivery vehicle T, and entrance management device 25 (refer to FIG. 2) are installed. Entrance management device 25 is a computer including CPU, ROM, RAM, a storage device, a communication module, and the like, and acquires an ID of delivery vehicle T arriving at entrance 2 based on imaging data (image data) of entrance camera 20. That is, entrance camera 20 and entrance management device 25 function as an ID acquisition device of entrance 2. In the present embodiment, the ID of delivery vehicle T is, for example, a number given in advance to delivery vehicle T from physical distribution center 1, and a marker (not illustrated) indicating the ID is attached to delivery vehicle T so as to be recognizable from entrance camera 20. It is noted that, the ID of delivery vehicle T may be an automobile registration number of delivery vehicle T or a number of an in-vehicle device such as an ETC acquired via a communication device (not illustrated). Further, entrance management device 25 causes monitor 21 to display information to be provided to the driver.

Each of shipping gates 3a to 3l is provided with camera 30 that images delivery vehicle T that has arrived at shipping gates 3a to 3l, wheeled platform detector 31 that can image wheeled platform 5 that passes when being loaded on delivery vehicle T, and shipping gate management device 35

(refer to FIG. 2). Shipping gate management device 35 is a computer including CPU, ROM, RAM, a storage device, a communication module, and the like, and acquires the ID of delivery vehicle T that has arrived at shipping gate 3a, 3b, ..., or 3l based on imaging data (image data) of camera 30. That is, camera 30 and shipping gate management device 35 function as delivery vehicle ID acquisition devices in each of shipping gates 3a to 3l. In addition, shipping gate management device 35 acquires the ID of wheeled platform 5 loaded on delivery vehicle T based on imaging data (image data) of wheeled platform detector 31. That is, wheeled platform detector 31 and shipping gate management device 35 function as a wheeled platform ID acquisition device in each of shipping gates 3a to 3l.

Conveyor 4 includes main conveyance line 40 and multiple shipping lines 4a, 4b, 4c, 4d, 4e, 4f, 4g, 4h, 4i, 4j, 4k, and 4l branched from main conveyance line 40 so as to face the corresponding one of shipping gates 3a to 3l (hereinafter, the shipping lines are collectively referred to as "shipping line 4x" as appropriate). Conveyor 4 is controlled by conveyor control device 14 (refer to FIG. 2) which is a computer including CPU, ROM, RAM, a storage device, a communication module, and the like. A barcode seal indicating the ID is attached to package P handled in physical distribution center 1, and conveyor control device 14 controls conveyor 4 based on the ID of package P. That is, conveyor control device 14 acquires the ID of package P on main conveyance line 40 via a barcode reader (not illustrated), and causes conveyor 4 to sort package P conveyed to shipping area 3 by main conveyance line 40 to corresponding shipping line 4x based on the acquired ID.

Figure 3:
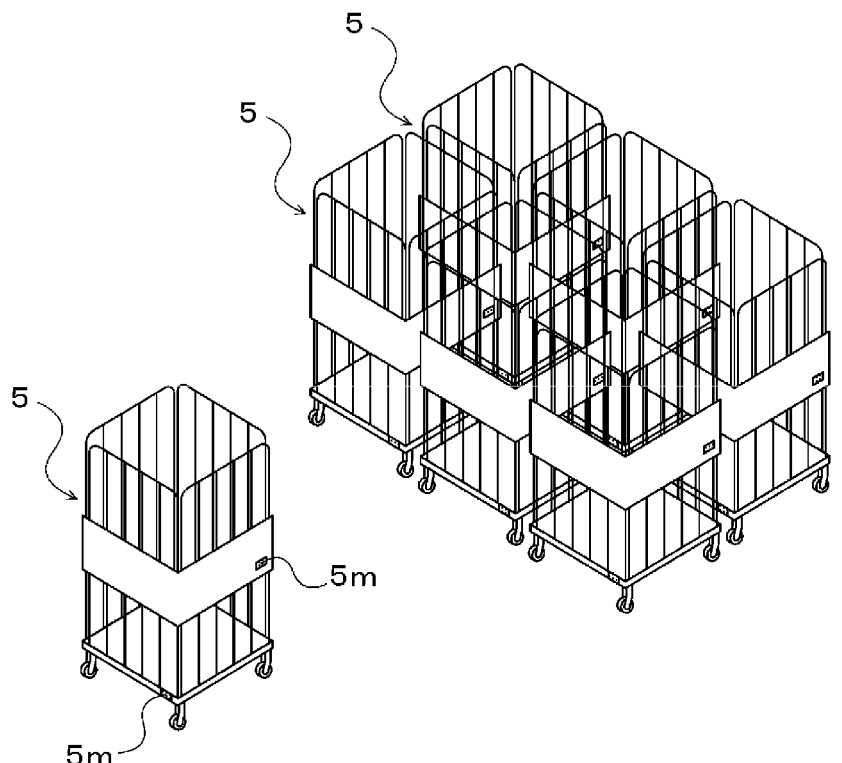
FIG. 3 is a perspective view illustrating a wheeled platform used in the physical distribution center of FIG. 1.

Wheeled platform 5 is a so-called basket wheeled platform as illustrated in FIG. 3, and includes marker 5m as a recognition target such as an AR marker, a QR code™, or a barcode indicating the ID of wheeled platform 5. Marker 5m is provided at least one position (two positions in the example of FIG. 3) of wheeled platform 5 so as to be recognizable by mobile robot 50 and wheeled platform detector 31. In physical distribution center 1, as illustrated in FIG. 1, storage location (arrangement location) 6 is secured in shipping area 3. Unused wheeled platform 5 is arranged to be aligned in storage location 6, and wheeled platform 5 which is the use target is identified by mobile robot 50 and conveyed from storage location 6 to the designated position. Further, multiple markers 3m, which are recognition targets such as the AR marker and QR code (registered trademark) for causing each mobile robot 50 to autonomously travel, are attached to the floor surface, columns, and the like of shipping area 3 in the building of physical distribution center 1.

As illustrated in FIG. 2, physical distribution management system 10 includes management server 11 as a management device and storage device 12. Management server 11 is a computer including CPU, ROM, RAM, a communication module, and the like. Management server 11 acquires various types of information from entrance management device 25 and shipping gate management devices 35 of shipping gates 3a to 3l, and transmits requested information and command signals to entrance management device 25 and shipping gate management devices 35. Further, management server 11 transmits the ID of package P and information necessary for sorting package P to conveyor control device 14, and exchanges information with AMR management device 15. AMR management device 15 is a computer including CPU, ROM, RAM, a storage device, a communication module, and the like, and manages multiple mobile robots 50 by exchanging information with multiple mobile robots 50 via wireless communication.

Storage device 12 of physical distribution management system 10 stores a delivery database in which information related to delivery of package P is stored for each of multiple delivery vehicles T to which IDs are assigned from physical distribution center 1. The delivery database stores, in the ID of delivery vehicle T, the ID of package P loaded on delivery vehicle T, the shipping destination of package P, and the ID of shipping gate 3x at which loading on delivery vehicle T is performed (hereinafter, referred to as a "loading gate 3z" as appropriate) in link with (in association with) each other. Further, storage device 12 stores area information including a movable area and a movement prohibited area of mobile robot 50 in shipping area 3 (physical distribution center 1), identification mark information of each area, position information of marker 3m, a time zone in which movement is prohibited, and the like.

Figure 4:
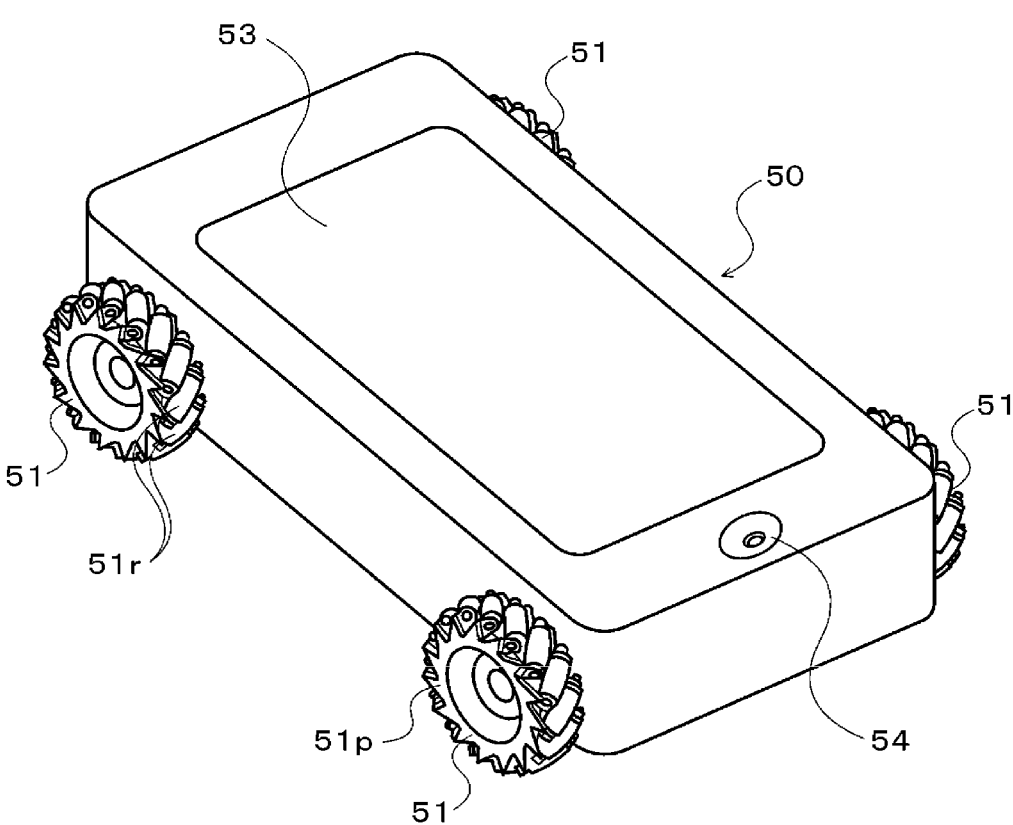
FIG. 4 is a perspective view illustrating the moving body including the control device of the present disclosure.
Figure 5:
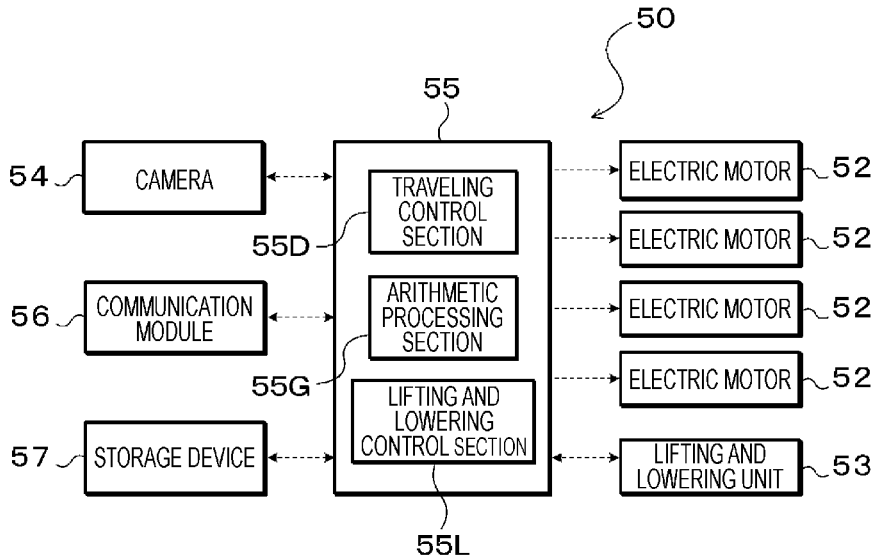
FIG. 5 is a control block diagram of the control device of the moving body of the present disclosure.

FIG. 4 is a perspective view illustrating mobile robot 50, and FIG. 5 is a control block diagram of mobile robot 50. As illustrated in FIGS. 4 and 5, mobile robot 50 includes multiple (four) mecanum wheels 51, multiple (four) electric motors 52 for rotationally driving corresponding mecanum wheels 51, and lifting and lowering unit 53 for lifting and lowering wheeled platform 5, and is configured to be movable forward and backward below wheeled platform 5. Each mecanum wheel 51 includes pair of support plates 51p, and multiple rollers 51r which are supported by pair of support plates 51p so as to be arranged in an annular shape and which are rotatable about an axis inclined by 45° with respect to an axle. Accordingly, by controlling the rotation directions and the rotation speeds of multiple electric motors 52, it is possible to move mobile robot 50 in all directions, and to spin turn, pivot turn, or power turn mobile robot 50. Lifting and lowering unit 53 includes a support member that supports wheeled platform 5, and a drive device that lifts and lowers the support member with respect to the main body of mobile robot 50 so that each wheel of wheeled platform 5 is separated from a traveling road surface or is grounded on the traveling road surface.

Mobile robot 50 further includes camera 54 serving as an imaging device, control device 55, communication module 56 provided for communication (wireless communication) with AMR management device 15 and other mobile robots 50, and storage device 57. Camera 54 images the surroundings of mobile robot 50 and transmits imaging data (image data) to control device 55. Control device 55 is a computer including CPU, ROM, RAM, and the like. As illustrated in FIG. 5, arithmetic processing section 55G, traveling control section 55D, and lifting and lowering control section 55L are constructed in control device 55 by cooperation between hardware such as CPU, ROM, and RAM and various programs installed in advance.

Arithmetic processing section 55G of control device 55 uses a VSLAM technology (self-location estimation technology), acquires the self-location (three-dimensional coordinates) in shipping area 3 (physical distribution center 1) of mobile robot 50 and the environment map based on the imaging data of camera 54 at predetermined time intervals (very short time) during traveling of mobile robot 50, and stores the self-location and the environment map in storage device 57. In addition, arithmetic processing section 55G can recognize (identify) marker 3m of shipping area 3 and marker 5m of wheeled platform 5 (the ID of wheeled platform 5) from the imaging data of camera 54, and can recognize (identify) the target object itself such as wheeled platform 5. Further, arithmetic processing section 55G recognizes marker 3m arranged in shipping area 3 during traveling of mobile robot 50, and corrects the estimated self-location and the environment map based on the position of marker 3m determined in advance. Arithmetic processing section 55G can adjust sensitivity (gain of the imaging element) and the exposure time (shutter speed) of camera 54. Further, arithmetic processing section 55G stores the imaging conditions of camera 54, that is, the sensitivity and the exposure time when the recognition targets such as markers 3m and 5m can be normally recognized from the imaging data of camera 54 in storage device 57 in association with the place (ID) of marker 3m or the like, or the time zone in which marker 3m or the like is imaged.

Traveling control section 55D of control device 55 controls multiple electric motors 52 based on the self-location (current position), the environment map, and the like acquired by arithmetic processing section 55G. Further, lifting and lowering control section 55L causes lifting and lowering unit 53 to lift or lower wheeled platform 5 when mobile robot 50 is positioned below wheeled platform 5. Arithmetic processing section 55G of control device 55 may be configured to acquire the self-location and the environment map by the SLAM technology using 2D or 3D LiDAR (laser sensor) or the like, may be configured to estimate the self-location based only on the position of the marker, or may be configured to acquire the self-location and the environment map by indoor positioning technology using a beacon or the like. Further, mobile robot 50 may include a wheel including a general rubber tire and a wheel other than a mecanum wheel such as an Omni Wheel (registered trademark).

Here, wheeled platform 5 which is not used in shipping area 3 of physical distribution center 1 is stored in storage location 6 in shipping area 3, but in order to improve the space efficiency of shipping area 3, it is necessary to narrow storage location 6 as much as possible and arrange multiple wheeled platforms 5 in storage location 6 without gaps. It is noted that, it is difficult to eliminate the estimation error of the self-location of mobile robot 50 that takes in and out wheeled platform 5 from the storage location, and it is not easy to stop mobile robot 50 at a target position with high accuracy. Therefore, control device 55 of mobile robot 50 controls mobile robot 50 so that wheeled platform 5 designated by AMR management device 15 is stored in storage location 6 in accordance with the procedure illustrated in FIGS. 6, 7, and 8 in order to minimize the interval between wheeled platforms 5 adjacent to each other in storage location 6. In the present embodiment, storage location 6 is divided into multiple arrangement sections in which one wheeled platform 5 is arranged respectively, and at least in an arrangement section (hereinafter, referred to as an "initial arrangement section") in which first wheeled platform 5 is stored in a state in which no wheeled platform 5 is stored in storage location 6, a marker (not illustrated) is provided to be able to be imaged by camera 54 of mobile robot 50.

Figure 6:
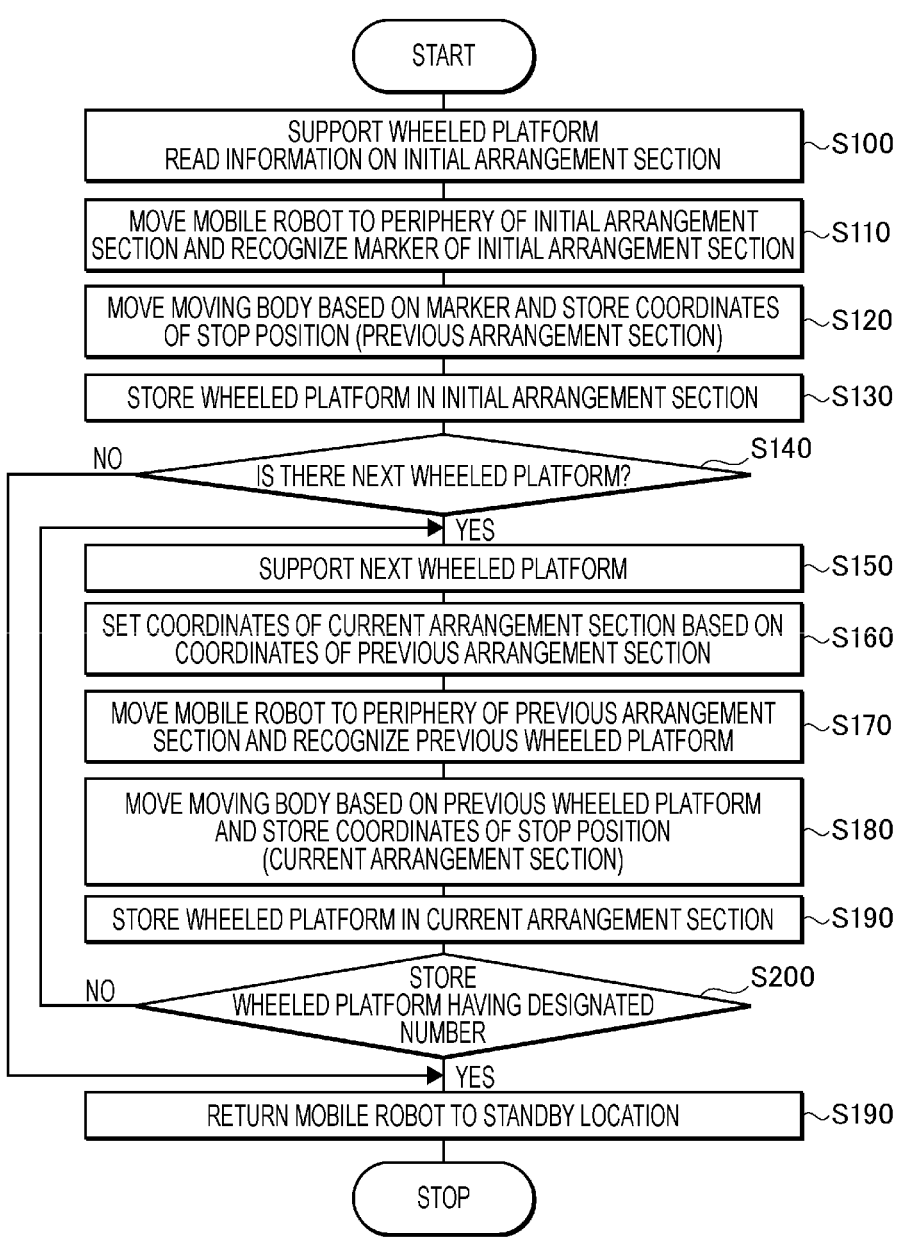
FIG. 6 is a flowchart illustrating a procedure of causing the moving body including the control device of the present disclosure to arrange a wheeled platform as the cargo handling device in a storage location.

FIG. 6 is a flowchart illustrating a procedure of storing multiple wheeled platforms 5 in empty storage location 6 by single mobile robot 50. Traveling control section 55D of control device 55 of single mobile robot 50 controls multiple electric motors 52 so that mobile robot 50 moves to the vicinity of wheeled platform 5 which is the first storage target designated from AMR management device 15 based on the self-location estimated by arithmetic processing section 55G. When arithmetic processing section 55G of control device 55 recognizes marker 5m of wheeled platform 5, traveling control section 55D controls multiple electric motors 52 so that mobile robot 50 enters below wheeled platform 5. Further, lifting and lowering control section 55L of control device 55 causes lifting and lowering unit 53 to lift wheeled platform 5. Accordingly, first wheeled platform 5 is supported by mobile robot 50 (Step S100). In Step S100, traveling control section 55D of control device 55 reads the information on the initial arrangement section in which first wheeled platform 5 is to be arranged received from AMR management device 15. Information on the initial arrangement section may be the coordinates of the initial arrangement section, the number (ID) of the arrangement section, or the like.

After the processing of Step S100, traveling control section 55D of control device 55 controls multiple electric motors 52 so that mobile robot 50 moves to the periphery of the initial arrangement section based on the information on the initial arrangement section from AMR management device 15 and the self-location estimated by arithmetic processing section 55G, and arithmetic processing section 55G recognizes the marker of the initial arrangement section from the imaging data of camera 54 (Step S110). Further, traveling control section 55D determines a stop position of mobile robot 50 based on the position of the marker of the initial arrangement section recognized by arithmetic processing section 55G, and controls multiple electric motors 52 so that mobile robot 50 moves to the stop position (Step S120). After stopping mobile robot 50, arithmetic processing section 55G of control device 55 acquires the coordinates of the stop position of mobile robot 50, and stores the coordinates as the coordinates of a previous arrangement section in storage device 57 (Step S120). In addition, lifting and lowering control section 55L of control device 55 causes lifting and lowering unit 53 to lower wheeled platform 5, and when the wheels of wheeled platform 5 are grounded, traveling control section 55D of control device 55 controls multiple electric motors 52 so that mobile robot 50 exits from below wheeled platform 5 (Step S130). Thus, first wheeled platform 5 is stored in the initial arrangement section.

When first wheeled platform 5 is stored in the initial arrangement section, traveling control section 55D of control device 55 determines whether the storage of next wheeled platform 5 is instructed from AMR management device 15 (Step S140). When it is determined that the storage of next wheeled platform 5 is not instructed (Step S140: NO), traveling control section 55D controls multiple electric motors 52 so that mobile robot 50 moves to a predetermined standby position (Step S210), and ends the storage of wheeled platform 5 in storage location 6.

In contrast, when it is determined that the storage of next wheeled platform 5 is instructed (Step S140: YES), traveling control section 55D controls multiple electric motors 52 so that mobile robot 50 moves to the vicinity of designated next wheeled platform 5. In addition, when arithmetic processing section 55G of control device 55 recognizes marker 5m of next wheeled platform 5, traveling control section 55D of control device 55 controls multiple electric motors 52 so that mobile robot 50 enters below wheeled platform 5. Further, lifting and lowering control section 55L of control device 55 causes lifting and lowering unit 53 to lift wheeled platform 5. Accordingly, wheeled platform 5 which is the next storage target is supported by mobile robot 50 (Step S150). In Step S150, traveling control section 55D of control device 55 reads the coordinates of the initial arrangement section where first wheeled platform 5 is arranged, in other words, the coordinates of the previous arrangement section of storage location 6 where previous wheeled platform 5 is arranged, from storage device 57. Further, traveling control section 55D sets the coordinates of a current arrangement section in which next wheeled platform 5 is to be arranged based on the coordinates of the previous arrangement section (initial arrangement section) (Step S160).

Next, traveling control section 55D of control device 55 controls multiple electric motors 52 so that mobile robot 50 moves to the periphery of the current arrangement section based on the coordinates of the current arrangement section in which next wheeled platform 5 is to be arranged and the self-location estimated by arithmetic processing section 55G, and arithmetic processing section 55G recognizes the marker of wheeled platform 5 stored in the previous arrangement section (initial arrangement section) from the imaging data of camera 54 (Step S170). Further, traveling control section 55D controls multiple electric motors 52 so that mobile robot 50 moves to the coordinates of the current arrangement section with reference to the position of marker 5m of wheeled platform 5 of the previous arrangement section recognized by arithmetic processing section 55G (Step S180). After stopping mobile robot 50, arithmetic processing section 55G of control device 55 acquires the coordinates of the stop position of mobile robot 50 and stores the coordinates as the coordinates of the current arrangement section in storage device 57 (Step S180). Further, lifting and lowering control section 55L of control device 55 causes lifting and lowering unit 53 to lower wheeled platform 5, and when the wheels of wheeled platform 5 are grounded, traveling control section 55D controls multiple electric motors 52 so that mobile robot 50 exits from below wheeled platform 5 (Step S190). Thus, next (second) wheeled platform 5 is stored in the current arrangement section.

After the processing of Step S190, traveling control section 55D of control device 55 determines whether wheeled platforms 5 having the number designated by AMR management device 15 are stored in the storage location (Step S200). When control device 55 determines that wheeled platforms 5 having the designated number are not stored in the storage location (Step S200: NO), control device 55 executes the processing of Step S150 and the subsequent steps described above. In this case, in Step S150, the coordinates of the current arrangement section stored in most recent Step S180 are read as the coordinates of the previous arrangement section. When it is determined in Step S200 that wheeled platforms 5 having the designated number are stored in the storage location (Step S200: YES), multiple electric motors 52 are controlled so that mobile robot 50 moves to the predetermined standby position (Step S210), and the storage of wheeled platforms 5 in storage location 6 is ended.

Next, with reference to FIGS. 7 and 8, a procedure of storing multiple wheeled platforms 5 in empty storage location 6 by multiple mobile robots 50 will be described.

Control device 55 (traveling control section 55D) of first mobile robot 50 designated by AMR management device 15 controls multiple electric motors 52 so that mobile robot 50 moves to the vicinity of wheeled platform 5 which is the first storage target designated by AMR management device 15. When arithmetic processing section 55G recognizes marker 5m of wheeled platform 5, control device 55 of first mobile robot 50 controls multiple electric motors 52 and lifting and lowering unit 53 such that mobile robot 50 is caused to support first wheeled platform 5 (Step S300). In Step S300, control device 55 (traveling control section 55D) of first mobile robot 50 reads the information on the initial arrangement section in which first wheeled platform 5 is to be arranged, which is received from AMR management device 15.

After the processing of Step S300, control device 55 (traveling control section 55D) of first mobile robot 50 controls multiple electric motors 52 so that mobile robot 50 moves to the periphery of the initial arrangement section, and control device 55 (arithmetic processing section 55G) recognizes the marker of the initial arrangement section from the imaging data of camera 54 (Step S310). Further, control device 55 (traveling control section 55D) of first mobile robot 50 determines the stop position of mobile robot 50 based on the position of the marker of the initial arrangement section recognized by arithmetic processing section 55G, and controls multiple electric motors 52 so that mobile robot 50 moves to the stop position (Step S320). In addition, after mobile robot 50 is stopped, control device 55 (arithmetic processing section 55G) acquires the coordinates of the stop position of mobile robot 50 and stores the coordinates as the coordinates of the previous arrangement section in storage device 57 (Step S320). Further, control device 55 of first mobile robot 50 causes lifting and lowering unit 53 to lower wheeled platform 5 and causes multiple electric motors 52 to exit mobile robot 50 from below wheeled platform 5 after the wheels of wheeled platform 5 are grounded (Step S330). Thus, first wheeled platform 5 is stored in the initial arrangement section.

When first wheeled platform 5 is stored in the initial arrangement section, control device 55 (traveling control section 55D) of first mobile robot 50 determines whether the storage of further wheeled platform 5 is instructed from AMR management device 15 (Step S340). When control device 55 (traveling control section 55D) determines that the storage of further wheeled platform 5 is not instructed (Step S340: NO), control device 55 controls multiple electric motors 52 so that mobile robot 50 moves to the predetermined standby position (S345), and ends the storage of wheeled platform 5 in storage location 6. In contrast, when control device 55 (traveling control section 55D) of first mobile robot 50 determines that the storage of further wheeled platform 5 is instructed (Step S340: YES), control device 55 controls multiple electric motors 52 so that mobile robot 50 moves to the vicinity of wheeled platform 5 which is the designated storage target (Step S350). Further, in Step S350, control device 55 controls multiple electric motors 52 and lifting and lowering unit 53 such that mobile robot 50 is caused to support wheeled platform 5, and mobile robot 50 is temporarily stand by.

Control device 55 (traveling control section 55D) of second mobile robot 50 designated by AMR management device 15 controls multiple electric motors 52 so that mobile robot 50 moves to the vicinity of next wheeled platform 5 which is the storage target designated by AMR management device 15. When arithmetic processing section 55G recognizes marker 5m of wheeled platform 5, control device 55 of second mobile robot 50 controls multiple electric motors 52 and lifting and lowering unit 53 such that mobile robot 50 is caused to support next wheeled platform 5 as illustrated in FIG. 8 (Step S400). Further, in Step S400, control device 55 (traveling control section 55D) of second mobile robot 50 requests first mobile robot 50 to transmit the coordinates of the previous arrangement section in which first wheeled platform 5 is stored, that is, the initial arrangement section, and acquires the coordinates of the previous arrangement section (initial arrangement section) from first mobile robot 50. In addition, control device 55 (traveling control section 55D) sets the coordinates of the current arrangement section in which next wheeled platform 5 is to be stored based on the coordinates of the previous arrangement section (the initial arrangement section) (Step S410).

Next, control device 55 (traveling control section 55D) of second mobile robot 50 controls multiple electric motors 52 so that mobile robot 50 moves to the periphery of the current arrangement section, and arithmetic processing section 55G of control device 55 of second mobile robot 50 recognizes the marker of wheeled platform 5 stored in the previous arrangement section (initial arrangement section) from the imaging data of camera 54 (Step S420). Further, control device 55 (traveling control section 55D) controls multiple electric motors 52 so that mobile robot 50 moves to the coordinates of the current arrangement section with reference to the position of marker 5m of wheeled platform 5 of the previous arrangement section recognized by arithmetic processing section 55G (Step S430). After stopping mobile robot 50, arithmetic processing section 55G of control device 55 acquires the coordinates of the stop position of mobile robot 50 and stores the coordinates as the coordinates of the current arrangement section in storage device 57 (Step S430). Further, control device 55 of second mobile robot 50 causes lifting and lowering unit 53 to lower wheeled platform 5 and causes multiple electric motors 52 to exit mobile robot 50 from below wheeled platform 5 after the wheels of wheeled platform 5 are grounded (Step S440). Thus, the next (second) wheeled platform 5 is stored in the current arrangement section.

After the processing of Step S440, control device 55 (traveling control section 55D) of second mobile robot 50 determines whether the storage of further wheeled platform 5 is instructed from AMR management device 15 (Step S450). When control device 55 (traveling control section 55D) determines that the storage of further wheeled platform 5 is not instructed (Step S450: NO), control device 55 controls multiple electric motors 52 so that mobile robot 50 moves to the predetermined standby position (S455), and ends the storage of wheeled platform 5 in storage location 6. In contrast, when control device 55 (traveling control section 55D) of second mobile robot 50 determines that the storage of further wheeled platform 5 is instructed (Step S450: YES), control device 55 controls multiple electric motors 52 so that mobile robot 50 moves to the vicinity of wheeled platform 5 which is the designated storage target (Step S460). Further, in Step S460, control device 55 controls multiple electric motors 52 and lifting and lowering unit 53 such that mobile robot 50 is caused to support wheeled platform 5, and causes mobile robot 50 to temporarily stand by.

Figure 8:
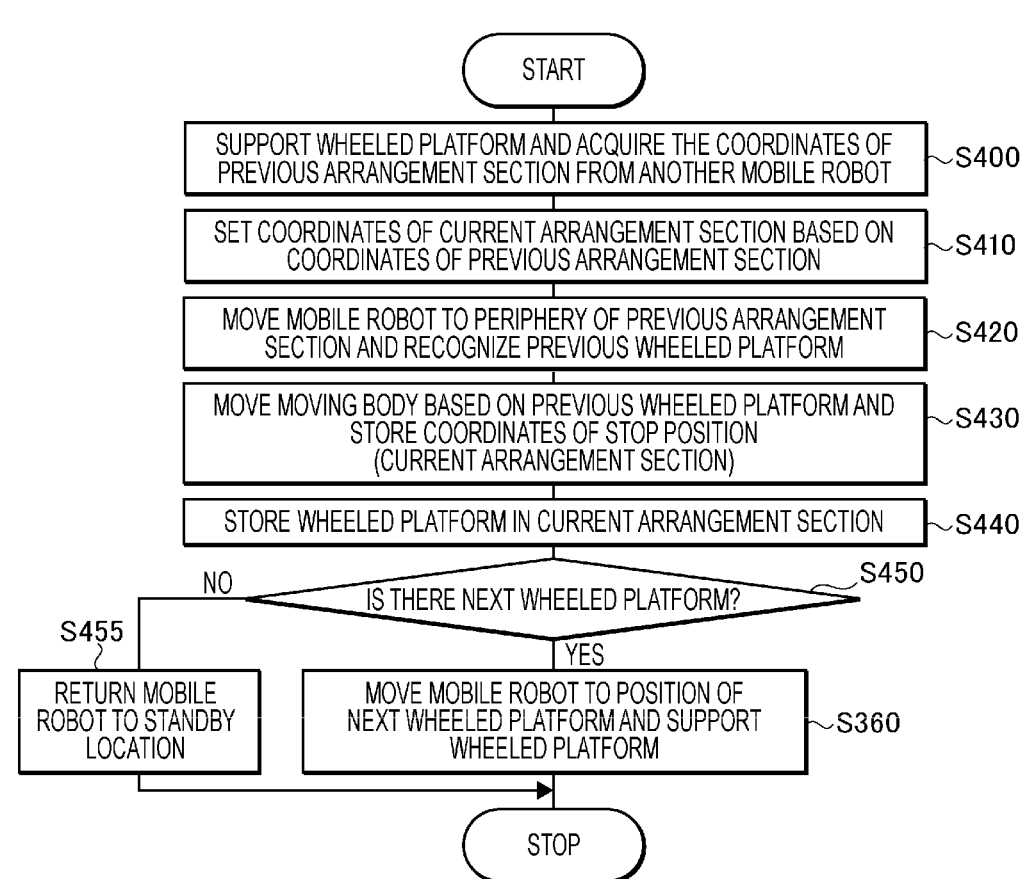
FIG. 8 is a flowchart illustrating another procedure of causing the moving body including the control device of the present disclosure to arrange the wheeled platform as the cargo handling device in the storage location.

For example, when three or more wheeled platforms 5 are stored in storage location 6 by two mobile robots 50 such as first and second mobile robots 50, second mobile robot 50 executes the processing of Steps S400 to S460 of FIG. 8, and then first mobile robot 50 executes the processing of Steps S400 to S460 of FIG. 8. In this case, in Step S400, first mobile robot 50 acquires the coordinates of the current arrangement section acquired in Step S430 by second mobile robot 50 as the coordinates of the previous arrangement section. Further, when three or more wheeled platforms 5 are stored in storage location 6 by three or more mobile robots 50, after the processing of Steps S400 to S460 of FIG. 8 is executed by second mobile robot 50, the processing of Steps S400 to S460 of FIG. 8 is executed by third mobile robot 50.

As described above, when causing mobile robot 50 which is the moving body capable of moving while estimating the self-location to align and arrange multiple wheeled platforms 5 (cargo handling devices) in storage location 6, control device 55 of mobile robot 50 acquires the position of previous wheeled platform 5 placed in advance in the storage location 6, that is, the coordinates of the previous arrangement section (Step S150 of FIG. 6 and Step S400 of FIG. 8). Further, control device 55 causes mobile robot 50 to place next wheeled platform 5 in the current arrangement section which is the position determined based on the acquired coordinates of the previous arrangement section (the position of previous wheeled platform 5) (Steps S160 to S190 in FIG. 6, and Steps S410 to S440 in FIG. 8). Accordingly, even when an error occurs in the estimation of the self-location in mobile robot 50 (arithmetic processing section 55G), it is possible to place next wheeled platform 5 in the arrangement section of storage location 6 while reducing the gap with previous wheeled platform 5 as much as possible. As a result, multiple wheeled platforms 5 can be aligned and arranged in storage location 6 so that the gap is as small as possible.

Further, when arranging next wheeled platform 5 in storage location 6, control device 55 recognizes marker 5m of previous wheeled platform 5 and moves mobile robot 50 based on the position of marker 5m of previous wheeled platform 5 (Step S180 of FIG. 6 and Step S430 of FIG. 8). Accordingly, it is possible to further reduce the gap between previous wheeled platform 5 and next wheeled platform 5.

Further, control device 55 acquires the position of previous wheeled platform 5, that is, the coordinates of the previous arrangement section, and stores them in storage device 57 (Step S120 in FIG. 6), and acquires the position of next wheeled platform 5, that is, the coordinates of the current arrangement section, and stores them in storage device 57 (Step S180 in FIG. 6). Accordingly, multiple wheeled platforms 5 can be aligned and arranged in storage location 6 so that the gap becomes as small as possible by using single mobile robot 50.

Further, when multiple wheeled platforms 5 are stored in storage location 6 by using multiple mobile robots 50, the position of previous wheeled platform 5, that is, the coordinates of the previous arrangement section is acquired by mobile robot 50 (another moving body) that has placed previous wheeled platform 5 in storage location 6 (Step S320 in FIG. 7), and control device 55 of mobile robot 50 that conveys next wheeled platform 5 acquires the coordinates of the previous arrangement section from control device 55 of mobile robot 50 (another moving body) that has conveyed previous wheeled platform 5 (Step S400 in FIG. 8). Accordingly, multiple wheeled platforms 5 can be sequentially aligned and arranged in storage location 6 so that the gap becomes as small as possible by using multiple mobile robots 50. It is noted that, in this case, the position of previous wheeled platform 5, that is, the coordinates of the previous arrangement section are not necessarily directly exchanged between mobile robots 50 as described above, and the coordinates of the previous arrangement section may be indirectly exchanged between mobile robots 50. That is, in Step S320 of FIG. 7, the coordinates of the previous arrangement section may be transmitted from control device 55 of mobile robot 50 that has conveyed previous wheeled platform 5 to AMR management device 15, and in Step S400 of FIG. 8, control device 55 of mobile robot 50 that conveys next wheeled platform 5 may acquire the coordinates of the previous arrangement section from AMR management device 15 (another device).

Figure 7:
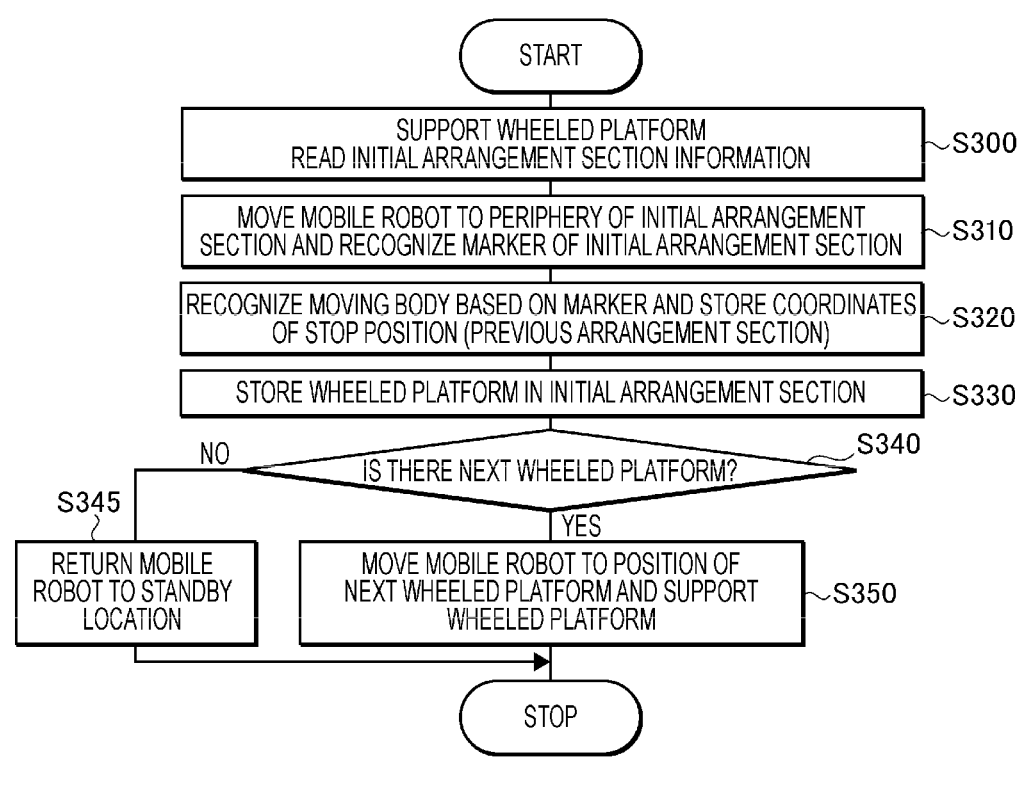
FIG. 7 is a flowchart illustrating another procedure of causing the moving body including the control device of the present disclosure to arrange the wheeled platform as the cargo handling device in the storage location.

Further, when first wheeled platform 5 is arranged in storage location 6, control device 55 of mobile robot 50 recognizes the marker attached to the initial arrangement section in which first wheeled platform 5 is to be arranged, and moves mobile robot 50 based on the position of the marker (Step S120 of FIG. 6 and Step S320 of FIG. 7). Accordingly, it is possible to accurately arrange first wheeled platform 5 in the initial arrangement section. It is noted that, control device 55 of mobile robot 50 may cause mobile robot 50 to place first wheeled platform 5 in the initial arrangement section based on the coordinates of the initial arrangement section (absolute position designated in advance) in storage location 6.

The storage location of wheeled platform 5 is not limited to the location provided in physical distribution center 1, and may be, for example, a store, a retail store such as a shopping center, or a storage location provided in a stockroom of the retail store. Further, the arrangement location of wheeled platform 5 may be provided, for example, around a production line called a component mounting line. The cargo handling device stored in the storage location (arrangement location) is not limited to wheeled platform 5, and may be a pallet having no wheels.

Further, mobile robot 50 includes multiple mecanum wheels 51 that are rotationally driven by respective electric motors 52. Accordingly, mobile robot 50 can be smoothly moved in all directions with a higher degree of freedom of movement.

The present disclosure is by no means limited to the above embodiment, and it goes without saying that various changes can be made within the scope of the extension of the present disclosure. Further, the above embodiment is merely one specific aspect of the present disclosure.

INDUSTRIAL APPLICABILITY

The present disclosure can be used in a manufacturing industry of a moving body capable of recognizing and supporting a cargo handling device on which a package is placed and moving while estimating the self-location.

REFERENCE SIGNS LIST

1: physical distribution center, 2: entrance, 3: shipping area, 3a, 3b, 3c, 3d, 3e, 3f, 3g, 3h, 3i, 3j, 3k, 3l, 3x: shipping gate, 3m: marker, 4: conveyor, 4a, 4b, 4c, 4d, 4e, 4f, 4g, 4h, 4i, 4j, 4k, 4l, 4x: shipping line, 40: main conveyance line, 5: wheeled platform, 5m: marker, 6: storage location, 10: physical distribution management system, 11: management server, 12: storage device, 14: conveyor control device, 15: AMR management device, 20: entrance camera, 21: monitor, 25: entrance management device, 30: camera, 31: wheeled platform detector, 35: shipping gate management device, 50: mobile robot, 51: mecanum wheel, 51p: support plate, 51r: roller, 52: electric motor, 53: lifting and lowering unit, 54: camera, 55: control device, 55D: traveling control section, 55G: arithmetic processing section, 55L: lifting and lowering control section, 56: communication module, 57: storage device, P: package, T: delivery vehicle.

The invention claimed is:

1. A control device for a moving body capable of recognizing and supporting a cargo handling device on which a package is placed and moving while estimating a self-location,
 wherein the control device is configured to
  control the moving body to move a first cargo handling device to a first arrangement location,
  store first coordinates of first cargo handling device at the first arrangement location, acquire the first coordinates of the first cargo handling device and set second coordinates of a second cargo handling device at a second arrangement location based on the first coordinates, control the moving body to move the second cargo handling device to a periphery of the first arrangement location, recognize a first marker of the first cargo handling device at the first arrangement location, and control the moving body to move the second cargo handling device to the second arrangement location based on the first marker of the first cargo handling device.

2. The control device for the moving body according to claim 1, wherein the control device is configured to store the first coordinates of the first cargo handling device in a storage device, and acquire the second arrangement location of the second cargo handling device and store the second coordinates of the second cargo handling device in the storage device.

3. The control device for the moving body according to claim 1, wherein the first coordinates of the first cargo handling device is acquired by an other moving body by which the first cargo handling device is placed at the first arrangement location, and the first coordinates of the first cargo handling device is directly or indirectly acquired from the other moving body.

4. The control device for the moving body according to claim 1, wherein the control device is configured to, when the first cargo handling device is arranged at the first arrangement location, recognize a marker attached to a position where the first cargo handling device is to be arranged and move the moving body based on a position of the marker.

5. The control device for the moving body according to claim 1, wherein the control device is configured to control the moving body to arrange the first cargo handling device at a predetermined position of the first arrangement location.

6. The control device for the moving body according to claim 1, wherein the first arrangement location is a storage location of the cargo handling device, the storage location being provided in a physical distribution center, a store, a retail store, a stockroom of a retail store, or around a production line.

7. The control device for the moving body according to claim 1, wherein the cargo handling device is a wheeled platform or a pallet.

8. The control device for the moving body according to claim 1, wherein the moving body includes multiple wheels configured to be rotationally driven by respective corresponding electric motors, the moving body being movable in all directions.

9. A control method for a moving body capable of recognizing and supporting a cargo handling device on which a package is placed and moving while estimating a self-location, the method comprising:

controlling the moving body to move a first cargo handling device to a first arrangement location;

storing first coordinates of first cargo handling device at the first arrangement location;

acquiring the first coordinates of the first cargo handling device and set second coordinates of a second cargo handling device at a second arrangement location based on the first coordinates;

controlling the moving body to move the second cargo handling device to a periphery of the first arrangement location;

recognizing a first marker of the first cargo handling device at the first arrangement location; and controlling the moving body to move the second cargo handling device to the second arrangement location based on the first marker of the first cargo handling device.

* * * * *